(12) United States Patent
Nguyen (10) Patent No.: US 9,535,436 B2
(45) Date of Patent: Jan. 3, 2017

(54) CONTROL DEVICE FOR HYBRID ELECTRIC POWER SYSTEM

(71) Applicant: LSIS CO., LTD., Anyang-si, Gyeonggi-do (KR)

(72) Inventor: Khanh-Loc Nguyen, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 475 days.

(21) Appl. No.: 14/053,406

(22) Filed: Oct. 14, 2013

(65) Prior Publication Data

US 2014/0139027 A1    May 22, 2014

(30) Foreign Application Priority Data

Nov. 16, 2012    (KR) .......................... 10-2012-0130138

(51) Int. Cl.
    *G05F 1/10*    (2006.01)
    *H02J 3/38*    (2006.01)
    (Continued)

(52) U.S. Cl.
    CPC . *G05F 1/10* (2013.01); *H02J 3/00* (2013.01); *H02J 3/385* (2013.01); *H02J 3/387* (2013.01);
    (Continued)

(58) Field of Classification Search
    CPC .......................... H02J 3/38–3/387; G05F 1/10
    (Continued)

(56) References Cited

U.S. PATENT DOCUMENTS

| 2009/0283128 A1* | 11/2009 | Zhang | ..................... H02J 3/383 136/244 |
| 2009/0284232 A1* | 11/2009 | Zhang | ...................... G05F 1/67 322/89 |

(Continued)

FOREIGN PATENT DOCUMENTS

| CN | 101047315 | 10/2007 |
| CN | 101752876 | 6/2010 |

(Continued)

OTHER PUBLICATIONS

Japan Patent Office Application Serial No. 2013-222196, Office Action dated Sep. 2, 2014, 3 pages.

(Continued)

*Primary Examiner* — Jung Kim
*Assistant Examiner* — James Evans
(74) *Attorney, Agent, or Firm* — Lee, Hong, Degerman, Kang & Waimey (57) ABSTRACT

A electric power control device for a hybrid electric power system according to the present disclosure includes an electric power measuring unit that is configured to measure output electric power of the electric power system, and a controller that is configured to control operations of a first electric power generator and a second electric power generator of the electric power system based on a preset control mode and the measured output electric power, wherein the controller controls an output voltage of the first electric power generator to be a first offset voltage corresponding to an output of the second electric power generator for a first (Continued)

time when the output of the second electric power generator is controlled to be switched from an ON state into an OFF state.

9 Claims, 4 Drawing Sheets (51) Int. Cl.
*H02J 3/00* (2006.01)
*H02J 3/48* (2006.01)

(52) U.S. Cl.
CPC .................. H02J 3/48 (2013.01); *Y02E 10/58* (2013.01); *Y10T 307/549* (2015.04)

(58) Field of Classification Search
USPC ..................................................... 307/52, 72
See application file for complete search history.

(56) References Cited

U.S. PATENT DOCUMENTS

| 2010/0156186 | A1 | 6/2010 | Kim et al. | |
|---|---|---|---|---|
| 2010/0327655 | A1* | 12/2010 | Okamoto | H02J 1/10 307/24 |
| 2011/0271927 | A1* | 11/2011 | Ueno | F02D 29/06 123/179.4 |
| 2011/0273019 | A1* | 11/2011 | de Caires | H02J 7/35 307/66 |
| 2011/0273022 | A1* | 11/2011 | Dennis | H02J 1/10 307/72 |
| 2012/0267952 | A1 | 10/2012 | Ballatine et al. | |
| 2013/0035802 | A1* | 2/2013 | Khaitan | G06F 1/263 700/297 |

FOREIGN PATENT DOCUMENTS

| CN | 201556969 | 8/2010 |
|---|---|---|
| JP | 06-110572 | 4/1994 |
| JP | 2005-245050 | 9/2005 |
| JP | 2009-135111 | 6/2009 |

OTHER PUBLICATIONS

European Patent Office Application Serial No. 13189491.7, Search Report dated May 12, 2014, 8 pages.

The State Intellectual Property Office of the People's Republic of China Application Serial No. 201310512775.2, Office Action dated Jun. 3, 2015, 9 pages.

\* cited by examiner

CONTROL DEVICE FOR HYBRID ELECTRIC POWER SYSTEM

CROSS-REFERENCE TO RELATED APPLICATION

Pursuant to 35 U.S.C. §119(a), this application claims the benefit of earlier filing date and right of priority to Korean Application No. 10-2012-0130138, filed on Nov. 16, 2012, the contents of which is incorporated by reference herein in its entirety.

BACKGROUND OF THE DISCLOSURE

1. Field of the Disclosure

This disclosure relates to an electric power control device for a hybrid electric power system, and particularly, to an electric power control device for a hybrid electric power system, capable of improving quality of output electric power in a hybrid electric power system including at least two types of electric power generators.

2. Background of the Disclosure

In recent years, electric power consumption keeps increasing around the world. However, an increase in electric power generating facilities is getting difficult due to limitation on the construction of large thermal electric power stations and nuclear power stations due to problems obtaining land sites, environmental issues, resource supply and demand and the like. Also, the sophistication of the overall industry leads to an increase in demands on electric power quality. Accordingly, requirements for developing various types of energy sources that take into account demand, management and control are increasing.

Responsive to this tendency, a hybrid electric power system using renewable energy, such as wind power, solar power, fuel cell energy and the like, is being developed. The hybrid electric power system diversifies electric power supply sources for supplying electric power and allows for selection of electric power supply sources according to conditions of the electric power system, so as to improve energy efficiency, reverse transmission of electric power, and reliability. Such hybrid electric power system is emerging as a next generation electric power Intelligent Technology (abbreviated as IT).

Figure 1:
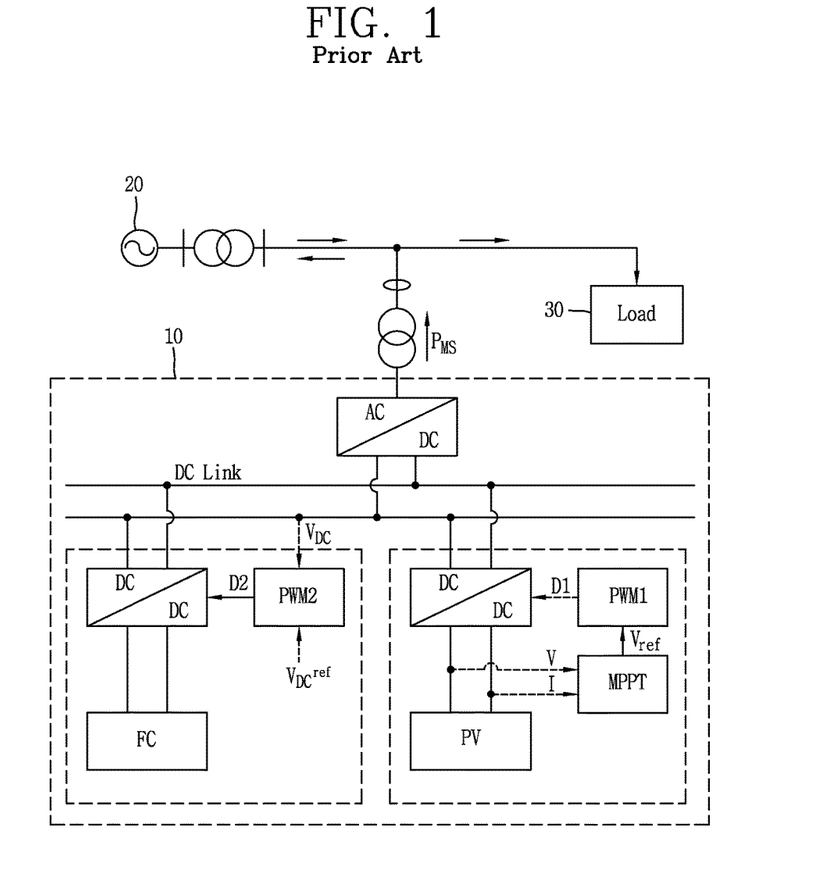
FIG. 1 is a block diagram illustrating a general hybrid electric power system.

FIG. 1 is a block diagram illustrating a general hybrid electric power system.

As illustrated in FIG. 1, a general hybrid electric power system 10 may be connected to a main grid 20. The hybrid electric power system 10 may distribute electric power in such a manner of selecting and adjusting electric power supplied from at least two renewable energy supply sources according to a change in a quantity of electric power required by an electric load (abbreviated as load hereinafter) 30.

The general hybrid electric power system 10 may maintain electric power supplied to the load 30 by appropriately distributing electric power supplied from the main grid 20 and at least two types of renewable energy supplied.

In more detail, the electric power supplied from the main grid 20 may be delivered to the load 30 through a transformer via a common connection point with the hybrid electric power system 10.

The general hybrid electric power system 10 may include renewable energy generators, for example, a solar energy generator (Photovoltaic generator, abbreviated as PV hereinafter) and a fuel cell energy generator(abbreviated as FC hereinafter), which are linked to each other by a DC link, so as to supply electric power through an DC/AC converter. A PWM control device of a DC/DC converter connected to the PV may efficiently control an output of the PV by a maximum electric power point tracking technology. Also, a PWM control device of a DC/DC converter connected to the FC may control a voltage of the DC link to control changes in outputs of the fuel cell in response to the change of the load 30.

Figure 2:
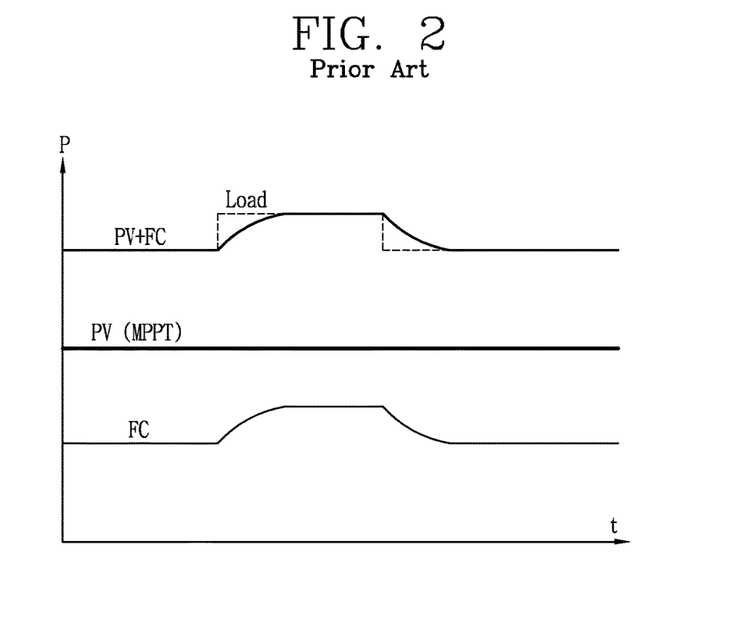
FIG. 2 is a view illustrating changes in output electric power of the general hybrid electric power system.

FIG. 2 is a view illustrating changes in output electric power of the general hybrid electric power system 10.

As illustrated in FIG. 2, under a state that an output of the PV is constant, an output of the FC may be required in response to the change of the load 30.

However, as illustrated in the graph of FIG. 2, in spite of a drastic change in a quantity of load-required electric power, an output response of the fuel cell energy generator FC is not fast. Consequently, an entire amount of output electric power (PV+FC) may gradually increase and then gradually decrease in spite of the drastic change in the quantity of load-required electric power.

The delay of the output response rate may cause a problem involved with electric power quality. Especially, when a load shedding or the like occurs in the electric power system, the output of the FC may be continuously maintained for a predetermined time, which may cause instability and an erroneous operation of the hybrid electric power system.

SUMMARY OF THE DISCLOSURE

Therefore, an aspect of the present disclosure is to provide an electric power control device for a hybrid electric power system capable of improving quality of electric power.

Another aspect of the present disclosure is to provide an electric power control device for a hybrid electric power system, capable of managing a drastic change of a load-required electric power.

Another aspect of the present disclosure is to provide an electric power control device for a hybrid electric power system, capable of overcoming a problem that electric power quality is lowered due to a slow output response rate of a fuel cell energy generator.

To achieve these and other advantages and in accordance with the purpose of this disclosure, as embodied and broadly described herein, there is provided an electric power control device for a hybrid electric power system, the device comprising:

an electric power measuring unit that is configured to measure output electric power of the electric power system; and a controller that is configured to control operations of a first electric power generator and a second electric power generator of the electric power system based on a preset control mode and the measured output electric power, wherein the controller is configured to control an output voltage of the first electric power generator to be a first offset voltage corresponding to an output of the second electric power generator for a first time when the output of the second electric power generator is controlled to be switched from an ON state into an OFF state.

In accordance with one aspect of the present disclosure, the controller is configured to control the output voltage of the first electric power generator to be a second offset voltage corresponding to the output of the second electric power generator for a second time when the output of the second electric power generator is controlled to be switched from the OFF state into the ON state.

In accordance with another aspect of the present disclosure, the controller is configured to change an operation mode of the first electric power generator into an offset voltage mode when corresponding to the first time or the second time.

In accordance with another aspect of the present disclosure, the controller is configured to control the first electric power generator in a maximum electric power point tracking control mode for other time except for the first time and the second time.

In accordance with another aspect of the present disclosure, the first electric power generator comprises a solar energy generator, and the second electric power generator comprises a fuel cell energy generator.

In accordance with another aspect of the present disclosure, the controller is configured to control the output of the second electric power generator to be switched from the ON state into the OFF state when a quantity of load-required electric power measured by the electric power measuring unit is below a predetermined value.

In accordance with another aspect of the present disclosure, the controller is configured to control the output of the second electric power generator to be switched from the OFF state into the ON state when a quantity of load-required electric power measured by the electric power measuring unit exceeds the output of the first electric power generator.

In accordance with another aspect of the present disclosure, the first offset voltage with respect to the first time is configured to be determined by an electric power transfer characteristic of the second electric power generator.

In accordance with another aspect of the present disclosure, a response rate of an output change by the control of the first electric power generator is configured to be faster than a response rate of an output change by the control of the second electric power generator.

In accordance with another aspect of the present disclosure, the second offset voltage with respect to the second time is configured to be determined by an electric power transfer characteristic of the second electric power generator.

Further scope of applicability of the present application will become more apparent from the present disclosure given hereinafter. However, it should be understood that the present disclosure and specific examples, while indicating preferred embodiments of the disclosure, are given by way of illustration only, since various changes and modifications within the spirit and scope of the disclosure will become apparent to those skilled in the art from the present disclosure.

BRIEF DESCRIPTION OF THE DRAWINGS

The accompanying drawings, which are included to provide a further understanding of the disclosure and are incorporated in and constitute a part of this disclosure, illustrate exemplary embodiments and together with the description serve to explain the principles of the disclosure.

In the drawings.

DETAILED DESCRIPTION OF THE DISCLOSURE

The following description is merely given to exemplarily illustrate an idea of the present disclosure. Therefore, it will be understood that those skilled in the art can invent various types of inventions, which implement the idea of the present disclosure and the conception and scope of the present disclosure. Also, every conditional term and exemplary embodiment disclosed herein are merely illustrative to help understanding of the idea of the present disclosure, not construed to limit the present disclosure to those exemplary embodiments and states.

It should also be understood that the present disclosure disclosing a specific embodiment as well as such idea, perspective and exemplary embodiments of the present disclosure is intended to include structural and functional equivalents to those items. Those equivalents should be construed to include not only equivalents which have been currently known but also equivalents to be developed in the future, namely, every device invented to execute the same function, irrespective of a structure.

Therefore, for example, the block diagrams disclosed herein should be understood as indicating a conceptual perspective of an exemplary circuit which embodies the idea of the present disclosure. Similarly, every flowchart, state conversion view, intension code and the like may substantially be implemented in a computer-readable medium, and should be understood to indicate various processes executed by a computer or a processor, irrespective of whether or not the computer or the processor is obviously illustrated.

Functions of various devices illustrated in the drawings including functional blocks indicated as processors or similar concepts can be provided using not only custom hardware but also hardware that has capability of executing software in association with appropriate software. Functions provided by a processor may be provided by a single decided processor, a single shared processor, a plurality of individual processors, or a combination of individual processors and shared processors.

The obvious use of the processor, a control or terms provided with similar meaning should not be construed by exclusively citing hardware having capability of executing software, but should be construed to implicitly include digital signal processor (DSP) hardware, and ROM, RAM and non-volatile memory for storing software. Other well-known hardware may also be included.

In claims of this disclosure, components represented as means for executing functions disclosed in the present disclosure, for example, have been intended to include all of methods of executing functions including every type of software including a combination of circuit devices or firmware/micro codes executing the functions, and will be connected to appropriate circuits for executing the software for performing the functions. The present disclosure defined by the claims should be construed as any component providing the functions is equivalent to being recognized from this disclosure because functions provided by various means specified are coupled to one another or coupled with methods required by claims.

The aforementioned objects, features and advantages will be more obvious by the following present disclosure in relation to the accompanying drawings, and the technical scope of the present disclosure will be easily practiced by those skilled in the art to which the present disclosure belongs. In describing the present invention, if a detailed explanation for a related known function or construction is considered to unnecessarily divert the gist of the present disclosure, such explanation has been omitted but would be understood by those skilled in the art.

Hereinafter, description will be given in detail of a preferred one exemplary embodiment according to the present disclosure with reference to the accompanying drawings.

Figure 3:
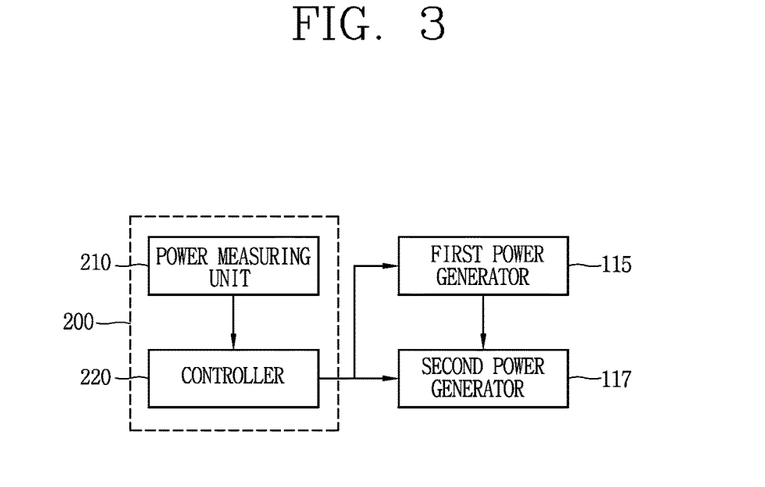
FIG. 3 is a block diagram illustrating an electric power control device for a hybrid electric power system in accordance with one exemplary embodiment of the present disclosure.

FIG. 3 is a block diagram illustrating an electric power control device for a hybrid electric power system in accordance with one exemplary embodiment of the present disclosure.

As illustrated in FIG. 3, an electric power control device 200 for a hybrid electric power system in accordance with one exemplary embodiment of the present disclosure may include an electric power measuring unit 210 that measures output electric power of the electric power system, and a controller 220 that controls operations of a first electric power generator 115 and a second electric power generator 117 of the electric power system based on a preset control mode and the measured output electric power.

Here, the hybrid electric power system may include at least two electric power generators using renewable energy.

Specifically, the controller 220 may control the operations of the first electric power generator 115 and the second electric power generator 117 included in the electric power system.

However, the electric power control device 200 according to the present disclosure may be used to control a plurality of electric power generators using different renewable energy, and also a type or the number of the electric power generator may not be limited.

The first electric power generator 115 and the second electric power generator 117 may show different control response rate (in other words control response speed). The response rate may depend on a type of renewable energy, or be determined by a response characteristic graph. In accordance with one exemplary embodiment, the response rate of the first electric power generator 115 may be lower (slower) than that of the second electric power generator 117.

For example, the first electric power generator 115 may be an electric power generator using solar energy (PV), and the second electric power generator 115 may be an electric power generator using a fuel cell (FC). The PV may exhibit a very fast control response rate, whereas the FC may exhibit a very slow control response rate by its response characteristic graph.

According to the response rate difference, a response rate of total output electric power as the final output may become slow. Therefore, the controller 220 may operate in an offset electric power mode for a predetermined time upon switching of the second electric power generator 117 with the slow response rate.

In the offset voltage mode, the controller 220 may control a voltage of the first electric power generator 115 with the fast response rate to be an offset voltage while a voltage of the second electric power generator 117 is slowly changed. In response to the operation of the controller 220, a speed of change in the total output electric power may become fast.

In the meantime, the electric power measuring unit 210 may measure an output electric power from each electric power generator connected to the electric power control device 200 and entire (total) electric power transferred from an output terminal of the hybrid electric power system, and deliver the measured electric power or entire electric power to the controller 220. The controller 220 may then control the operations of the first electric power generator 115 and the second electric power generator 117 based on the delivered electric power and a preset control mode.

For example, when a quantity of load-required electric power measured by the electric power measuring unit 210 is below a predetermined value, the controller 220 may control the second electric power generator to be switched from an ON state into an OFF state. When the quantity of load-required electric power measured by the electric power measuring unit 210 exceeds an output of the first electric power generator, the controller 220 may control the second electric power generator to be switched from the OFF state into the ON state. In such a manner, the controller 220 may flexibly adjust the output of the electric power generator according to the required electric power.

Figure 4:
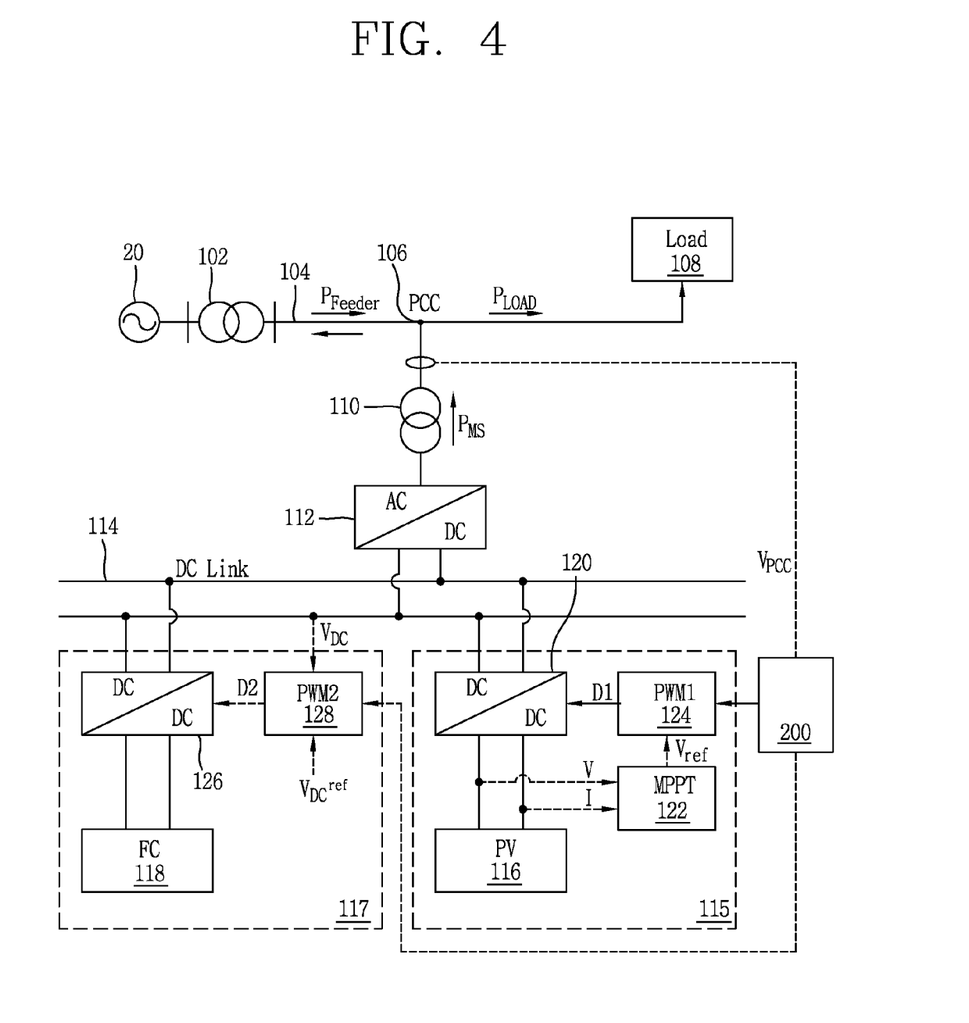
FIG. 4 is a block diagram illustrating an overall system including a control device for a hybrid electric power system in accordance with one exemplary embodiment of the present disclosure.

FIG. 4 is a block diagram illustrating an overall system including a control device for a hybrid electric power system in accordance with one exemplary embodiment of the present disclosure.

Hereinafter, description will be given in detail of an overall electric power system including a control device for a hybrid electric power system in accordance with one exemplary embodiment, with reference to FIG. 4.

An overall electric power system including a control device for a hybrid electric power system according to one exemplary embodiment may include a main grid 20 that supplies main electric power, a first transformer 102 connected to the main grid 20, a second transformer 110 connected to an output terminal of the hybrid electric power system, a supply line 104 connected to the first transformer 102, a common connection point (PCC) 106 connected to the second transformer 110 and the supply line 104, an electric load 108 connected to the PCC 106 via an electric load line, an inverter 112 that converts DC output by the hybrid electric power system into AC to transfer to the second transformer 110, a first electric power generator 115 connected to the inverter 112, a second electric power generator 117 connected to the inverter 112, and an electric power control device 200 connected to each of the first and second electric power generators 115 and 117 and the common connection point 106 to measure electric power and control operations of the overall electric power system.

The first electric power generator 115 may include a solar energy generator (abbreviated as PV hereinafter) 116, a maximum electric power point tracking (abbreviated as MPPT hereinafter) voltage generator 122, a first pulse amplitude modulator (abbreviated as PWM1 hereinafter) 124, and a first DC link 120.

Also, the second electric power generator 117 may include a fuel cell electric power generator (abbreviated as FC hereinafter) 118, a second pulse amplitude modulator (abbreviated as PWM2 hereinafter) 128, and a second DC link 126.

The first DC link 120 and the second DC link 126 may be configured by well-known DC link capacitors, which are providing a constant DC voltage.

The electric power control device 200 may be connected to the PWM1 124 and the PWM2 128, and control an operation of the pulse amplitude modulators 124, 128, thereby controlling outputs of the first and second electric power generators 115 and 117, respectively.

Especially, the controller 220 may control operations of the PWM1 124 and the PWM2 128 according to a preset operation mode. For example, for a solar energy generator such as the first electric power generator 115, the controller 220 may control the PWM1 124 in an MPPT mode according to a reference voltage generated in the MPPT voltage generator 112.

A control mode of the electric power generator controlled by the controller 220 may be a feeder flow control (abbreviated as FFC hereinafter) mode of constantly maintaining a flow of a line.

When the electric power generator is operating in the FFC mode, the controller 220 may adjust an output ($P_{ms}$) according to a change in a quantity of load-consumed electric power. This may allow the flow of electric power from the main grid 20 connected to the hybrid electric power system to be constantly maintained. Therefore, a main electric power supplier that supplies electric power to the main grid 20 may set an electric power grid including the hybrid electric power system as an electric load that consumes a predetermined quantity of electric power. This may facilitate measurement and control of electric power supplied to the grid.

A control mode of the controller 220 may be a unit electric power control (can be abbreviated as UPC hereinafter) mode of constantly maintaining output electric power of the electric power generator. In the UPC mode, the electric power control device 200 may constantly maintain a specific value of the output of the electric power generator, irrespective of an amount of feeder flow(in other words line flow).

The control mode of the controller 220 may be a mode of controlling an output of a solar cell, and this mode may be referred to as a MPPT mode.

Here, the MPPT is a method of solving a problem of a change in a magnitude of a DC voltage due to a change in a quantity of solar radiation, namely, denotes a method of controlling the power generator to track a maximum electric power point based on a DC voltage as a reference voltage of a solar cell array.

For example, the controller 220 may amplify and compare a tracked value according to the MPPT and a reference value, generate a current and voltage control signal as a gate control signal for an insulated gate bipolar transistor (can be abbreviated as IGBT), which is an amplitude modulation semiconductor switch included in the PWM1 124, and transfer the generated gate control signal to the PWM1 124, thereby controlling the first electric power generator 115 in the MPPT mode.

The operation of the controller 220 according to each mode may result in maximum utilization of energy which can be supplied based on an electric power transfer characteristic and an environmental change.

Meanwhile, as aforementioned, the controller 220 may control the operations of the first electric power generator 115 and the second electric power generator 117. Here, when an output of the second electric power generator 117 is controlled to be switched from an ON state into an OFF state, an output voltage of the first electric power generator 115 may be controlled to be a first offset voltage corresponding to an output voltage of the second electric power generator 117 for a first time.

When an output of the second electric power generator 117 is controlled to be switched from an OFF state into an ON state, the controller 220 may control the output voltage of the first electric power generator 115 to be a second offset voltage corresponding to an output of the second electric power generator 117 for a second time.

For the offset voltage control, the controller 220 may control the first electric power generator 115 in an offset voltage control mode for the first time or the second time. Also, the controller 220 may control the first electric power generator 115 in the MPPT mode for other time, except for the first time and the second time.

The first offset voltage or the second offset voltage for the first time or the second time may be determined by an electric power transfer characteristic of the second electric power generator 117. For example, when the electric power transfer characteristic of the second electric power generator 117 exhibits an extremely low response rate, a very low variation of an offset voltage with respect to a time may be controlled. Also, when the electric power transfer characteristic of the second electric power generator 117 exhibits a fast response rate, a great variation of an offset voltage with respect to a time may be controlled.

In the one exemplary embodiment of the present disclosure, when an electric power control response rate of the first electric power generator 115 is faster than that of the second electric power generator 117, the first offset voltage and the second offset voltage with respect to the first time and the second time may be determined, irrespective of the characteristic of the first electric power generator 115. Accordingly, an efficient electric power control may be allowed and the same effect as an increase in an overall electric power response rate may be aroused, resulting in improvement of quality of electric power.

Figure 5:
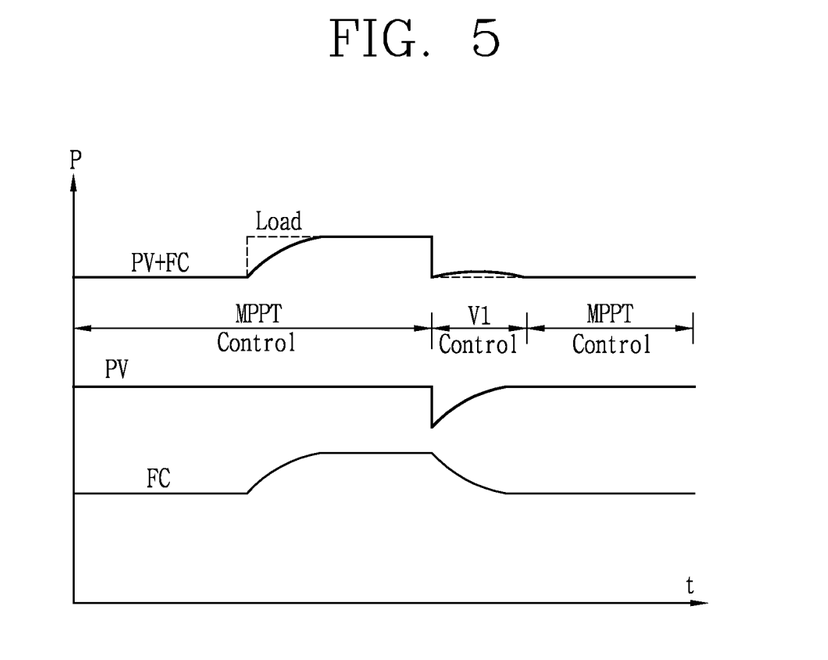
FIG. 5 is a graph illustrating output electric power according to an operation of a control device for a hybrid electric power system in accordance with one exemplary embodiment of the present disclosure.

FIG. 5 is a graph illustrating output electric power according to the operation of the control device for the hybrid electric power system in accordance with one exemplary embodiment of the present disclosure.

As illustrated in FIG. 5, when the output of the second electric power generator 117 is controlled to be switched from an ON state into an OFF state, the controller 220 may control an output voltage of the first electric power generator to be a first offset voltage corresponding to an output of the second electric power generator.

In more detail, a section indicated by V1 control (hereinafter, referred to as a V1 control section) in FIG. 5 shows a waveform of the first offset voltage corresponding to an output of the second electric power generator, as an output voltage of the first electric power generator for the first time. The first offset voltage may be determined according to an electric power characteristic which changes when an output state of the second electric power generator is switched from an ON state into an OFF state. The first offset voltage may be a voltage for offsetting that the output of the second electric power generator (i.e., FC) is gradually changed into zero(that is OFF state) without instant switching OFF. Therefore, the first offset voltage may be a negative voltage, whose absolute value is decreased, corresponding to a positive voltage having an absolute value decreased for the first time for which the second electric power generator is switched off.

As such, the electric power control device 200 according to this exemplary embodiment may allow even the entire output electric power (PV+FC) of the hybrid electric power system to be remarkably reduced within the V1 control section. Hence, even when an output of a fuel cell system as the second electric power generator is switched off due to reduction of a load-required electric power, a slow electric power reduction speed due to the fuel cell may be compensated for by an offset voltage of a solar energy system as the first electric power generator. This may allow an entire output to have an electric power reduction speed approximately the same as that of the first electric power generator.

Figure 6:
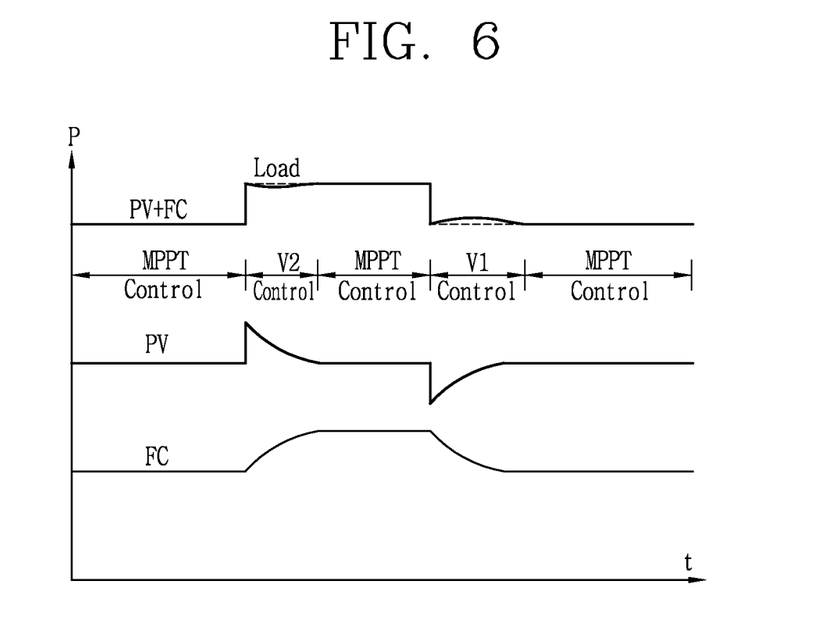
FIG. 6 is a graph illustrating output electric power according to an operation of a control device for a hybrid electric power system in accordance with another embodiment of the present disclosure.

FIG. 6 is a graph illustrating output electric power according to an operation of a control device for a hybrid electric power system in accordance with another exemplary embodiment of the present disclosure.

As illustrated in FIG. 6, a V2 control section indicates that an output voltage (PV) of the first electric power generator 115 is controlled by a second offset voltage corresponding to the output of the second electric power generator 117 for a second time when the output of the second electric power generator 117, namely, an output of the FC is controlled to be switched from an OFF state into an ON state.

In more detail, the V2 control section of FIG. 6 may show a similar waveform to the V1 control section. The second offset voltage may be determined according to an electric power characteristic which changes when the output of the second electric power generator FC is switched on. The second offset voltage may be a voltage for offsetting that the output voltage of FC is gradually increasing without instant switching ON. Therefore, the second offset voltage may be a positive voltage, whose absolute value is decreased, corresponding to a positive voltage having an absolute value increased for the second time for which the second electric power generator is switched on.

The electric power control device 200 according to the exemplary embodiment may allow for remarkable increase in the entire output electric power (PV+FC) of the hybrid electric power system within the V2 control section. Hence, even when an output of the fuel cell system as the second electric power generator is switched on due to an increase in a load-required electric power, a slow electric power increase speed due to the fuel cell may be compensated for by an offset voltage of a solar energy system as the first electric power generator. This may allow the entire output electric power to have an electric power increase speed approximately the same as that of the first electric power generator.

Meanwhile, an electric power switching control with respect to the second electric power generator 117 may be changed according to a load-required electric power measured by the electric power measuring unit 210. For example, when load-required electric power exceeds the output of the first electric power generator 115, the controller may control the output of the second electric power generator 117 to be switched from an OFF state into an ON state. Also, when the load-required electric power measured by the electric power measuring unit 210 is below a predetermined value, the controller 220 may control the output of the second electric power generator 117 to be switched from an ON state into an OFF state.

As such, according to the operation of the electric power control device 200, the hybrid electric power system may have a fast response rate, and achieve a fast electric power change in response to an electric load change. Also, the electric power control device 200 may execute an output control suitable for conditions in a manner of a mode control, which may result in an efficient electric power control.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A electric power control device for a hybrid electric power system, the device comprising:
   an electric power measuring unit configured to measure output electric power of the electric power system; and
   a controller configured to:
   control operations of a first electric power generator and a second electric power generator of the electric power system based on a preset control mode and the measured output electric power;
   control an output voltage of the first electric power generator to be a first offset voltage corresponding to an output of the second electric power generator for a first time duration when the output of the second electric power generator is controlled to switch from an ON state to an OFF state; and
   control the output voltage of the first electric power generator to be a second offset voltage corresponding to the output of the second electric power generator for a second time duration when the output of the second electric power generator is controlled to switch from the OFF state to the ON state.

2. The device of claim 1, wherein the controller is further configured to change an operation mode of the first electric power generator to an offset voltage mode when the operation mode corresponds to the first time duration or the second time duration.

3. The device of claim 2, wherein the controller is further configured to control the first electric power generator in a maximum electric power point tracking control mode for time durations other than the first time duration and the second time duration.

4. The device of claim 1, wherein:
   the first electric power generator comprises a solar energy generator; and
   the second electric power generator comprises a fuel cell energy generator.

5. The device of claim 1, wherein the controller is further configured to control the output of the second electric power generator switch from the ON state to the OFF state when a quantity of load-required electric power measured by the electric power measuring unit is below a predetermined value.

6. The device of claim 1, wherein the controller is further configured to control the output of the second electric power generator switch from the OFF state to the ON state when a quantity of load-required electric power measured by the electric power measuring unit exceeds the output voltage of the first electric power generator.

7. The device of claim 1, wherein the first offset voltage is determined by an electric power transfer characteristic of the second electric power generator.

8. The device of claim 1, wherein a response rate of an output change according to control of the first electric power generator is configured to be faster than a response rate of an output change according to the control of the second electric power generator.

9. The device of claim 1, wherein the second offset voltage is determined by an electric power transfer characteristic of the second electric power generator.

* * * * *